United States Patent
Swarnkar et al.

(10) Patent No.: US 8,127,100 B1
(45) Date of Patent: Feb. 28, 2012

(54) UNLIMITED SUB-SEGMENT SUPPORT IN A BUFFER MANAGER

(75) Inventors: Jitendra Kumar Swarnkar, Sunnyvale, CA (US); Vincent Wong, Fremont, CA (US); Jing Booth, San Jose, CA (US); Jie Du, Santa Clara, CA (US)

(73) Assignee: Marvell International Ltd (BM)

( * ) Notice: Subject to any disclaimer, the term of this patent is extended or adjusted under 35 U.S.C. 154(b) by 821 days.

(21) Appl. No.: 12/104,357

(22) Filed: Apr. 16, 2008

Related U.S. Application Data (60) Provisional application No. 60/912,031, filed on Apr. 16, 2007, provisional application No. 60/955,150, filed on Aug. 10, 2007.

(51) Int. Cl.
- *G06F 12/00* (2006.01)
- *G06F 13/00* (2006.01)
- *G06F 13/28* (2006.01)
- *G06F 9/26* (2006.01)
- *G06F 9/34* (2006.01)

(52) U.S. Cl. .................. 711/170; 711/118; 711/205

(58) Field of Classification Search .............. 711/118, 711/205, 170
See application file for complete search history.

(56) References Cited

U.S. PATENT DOCUMENTS

| | | | |
|---|---|---|---|
| 5,539,897 A * | 7/1996 | Samanta et al. | 711/165 |
| 2005/0027901 A1 * | 2/2005 | Simon et al. | 710/22 |
| 2005/0251617 A1 * | 11/2005 | Sinclair et al. | 711/103 |

* cited by examiner

*Primary Examiner* — Jared Rutz
*Assistant Examiner* — Ryan Bertram

(57) ABSTRACT

A system and method of buffer management may employ a common data structure that is recognizable by both hardware and firmware. In some implementations, hardware register settings may be programmed independent of firmware updates to an internal sub-segment description table maintained in an ASIC or other buffer manager logic. Implementation of such a common data structure in external memory may substantially reduce hardware real estate and complexity of a buffer manager ASIC by minimizing the number of required registers and eliminating the need for an internal sub-segment descriptor table. In addition, by eliminating the internal sub-segment descriptor table and allowing buffer manager logic to recognize a common data structure in external memory, the number of buffer sub-segments recognized by the buffer manager may be readily expanded, and may be limited only by the size of the external memory.

20 Claims, 6 Drawing Sheets

UNLIMITED SUB-SEGMENT SUPPORT IN A BUFFER MANAGER

CROSS-REFERENCE TO RELATED APPLICATIONS

The present application claims the benefit of the following U.S. provisional applications: Ser. No. 60/955,150, filed Aug. 10, 2007, entitled "Hard Drive Command Overhead Reduction;" and Ser. No. 60/912,031, filed Apr. 16, 2007, entitled "Unlimited Sub-Segment Support in BM." The disclosures of the foregoing applications are incorporated herein by reference in their entireties.

BACKGROUND

1. Field of the Invention

Aspects of the present invention relate generally to disk drive or other recording media buffer hardware, and more particularly to a system and method of supporting unlimited sub-segments in a buffer manager.

2. Description of Related Art

Hard disk drive and other computer peripheral venders compete to provide products having superior performance measurements. Engineers constantly look for new opportunities to improve algorithms or to utilize hardware efficiently to improve product benchmark scores. Engineering challenges to improve disk drive and other recording media device performance include, but are not limited to: reducing command overhead; improving cache hit rates; improving cache buffer space usage; improving disk I/O operations; and improving host I/O operations.

Figure 1:
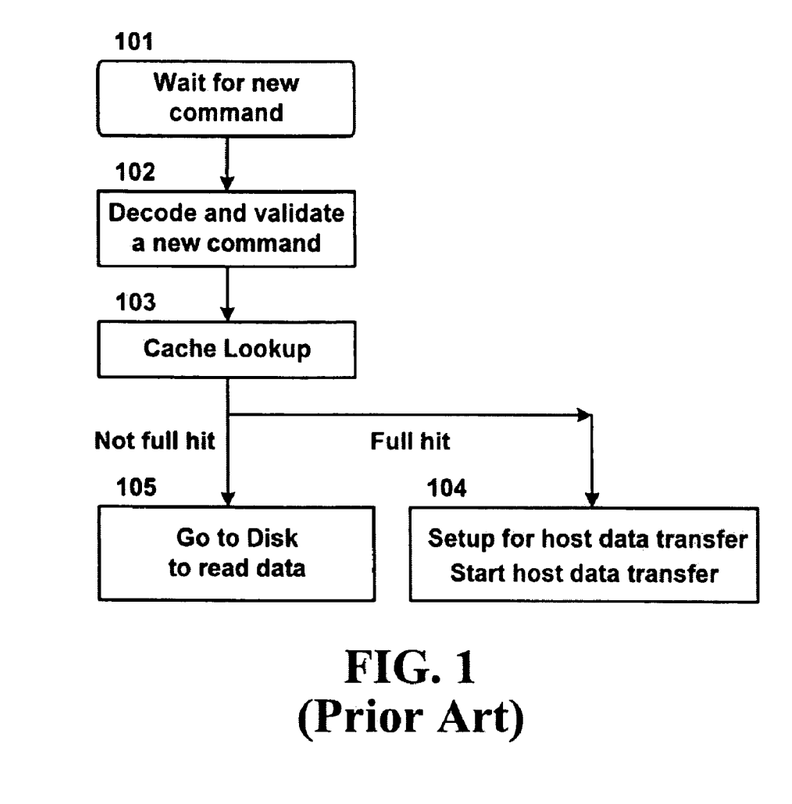
FIG. 1 is simplified flow diagram illustrating execution of a typical read command.

When a disk drive (e.g., a hard disk drive, floppy disk drive, compact disk (CD) drive, or a digital versatile disk (DVD) drive) receives a command, and before the drive requests data transfer with a host machine, setting up a buffer is generally a necessary step. FIG. 1 is simplified flow diagram illustrating execution of a typical read command. Upon receiving a new read command, if the requested data are all in the cache (or "buffer"), data will be transferred to the host machine immediately (blocks 103 and 104); alternatively, when the cache does not contain all the data associated with the read command, the disk must be read (block 105). The operations depicted at blocks 102, 103, and 104 are generally recognized as "command overhead." It is generally desirable to reduce the required execution time for these operations.

Typical hardware solutions for buffer management, such as may be implemented in an application specific integrated circuit (ASIC), employ linked lists used by firmware to identify and to manage buffer segments and sub-segments. Depending upon the caching scheme employed, however, the number of buffer sub-segments required or recognized by the firmware may be far greater than the number of buffer sub-segments supported by the hardware, which is generally limited by the number of hardware registers (which must be programmed or set by firmware) or other physical constraints built into the hardware logic. In accordance with one traditional solution, this limitation requires firmware to execute extra code steps or routines in order to recycle the hardware sub-segments while host or disk data transfer is active. The recycling is typically done in the buffer interrupt service routine (ISR) and requires additional firmware execution time, increasing command overhead and ultimately degrading performance.

Although improving the efficiency of buffer set up and enabling hardware to support unlimited buffer sub-segments may have utility in various applications, conventional buffer management strategies are deficient in both of these areas.

SUMMARY

Embodiments of the present invention overcome the above-mentioned and various other shortcomings of conventional technology, providing a system and method of buffer management that employ a common data structure that is recognizable by both hardware and firmware. In some implementations, hardware register settings may be programmed independent of firmware updates to an internal sub-segment description table maintained in an ASIC or other buffer manager logic. Implementation of such a common data structure in external memory may substantially reduce hardware real estate and complexity of a buffer manager ASIC by minimizing the number of required registers and eliminating the need for an internal sub-segment descriptor table. In addition, by eliminating the internal sub-segment descriptor table and allowing buffer manager logic to recognize a common data structure in external memory, the number of buffer sub-segments recognized by the buffer manager may be readily expanded, and may be limited only by the size of the external memory.

The foregoing and other aspects of various embodiments of the present invention will be apparent through examination of the following detailed description thereof in conjunction with the accompanying drawing figures.

DETAILED DESCRIPTION

The data structures and buffer management strategies set forth herein may have utility in connection with any of various types of transfers between a host device (e.g., a personal or laptop computer, workstation, personal digital assistant (PDA), wireless telephone, or other electronic apparatus) and a digital data recording medium such as a disk drive. In the context of the present disclosure, the term "disk" is intended to encompass a hard disk, a floppy disk, a compact disk (CD), a digital versatile disk (DVD), or other magneto, optical, or magneto-optical storage media, as well as solid state (e.g., "Flash") memory devices; accordingly, the term "drive" or "disk drive" is intended broadly to encompass the hardware enabling read/write data transfer operations between the host and any such disk or other recording medium. Many such data transfer operations employ caching (e.g., with a buffer and a buffer manager) to facilitate device performance.

In general, a buffer (i.e., the physical memory used to store data) may be logically divided into a number of segments representing memory address ranges, with each segment further divided into a number of sub-segments. In hardware, the number of sub-segments supported by a buffer manager is generally limited by the number of registers or memory locations built into the hardware logic structure for that purpose. In many applications, firmware maintains its own sub-segment data structures and is generally employed indirectly to program hardware data structures (e.g., registers) in order to prepare for host or disk data transfer. By way of illustration, FIG. 2 is a simplified diagram illustrating one embodiment of a portion of a firmware data structure including an array of buffer descriptors, FIG. 3 is a simplified diagram illustrating one embodiment of a portion of a hardware data structure including a linked list of buffer sub-segment descriptors, and FIG. 4 is a simplified diagram illustrating one embodiment of a portion of a hardware data structure including an array of buffer sub-segment descriptors.

Figure 2:
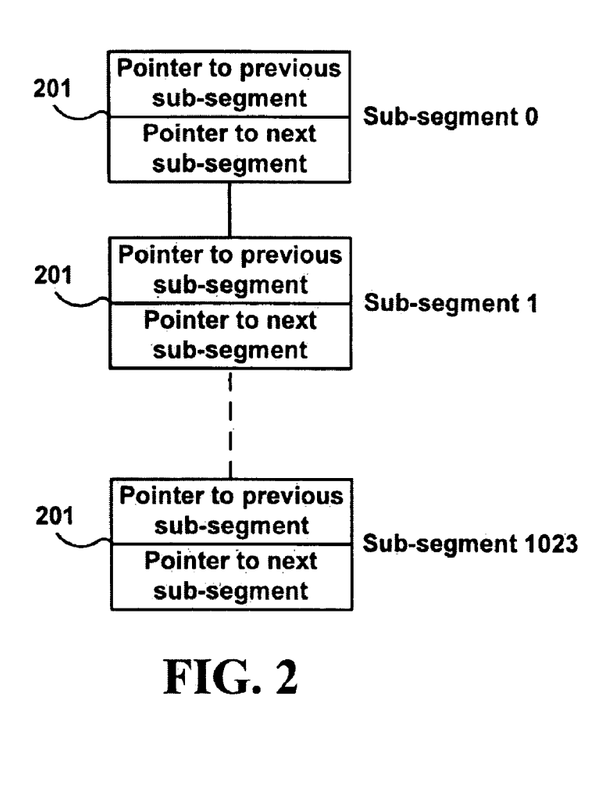
FIG. 2 is a simplified diagram illustrating one embodiment of a portion of a firmware data structure including an array of buffer descriptors.

As illustrated in FIG. 2, for each firmware sub-segment, a buffer descriptor 201 may include two pointers: one for linking a previous buffer sub-segment; and one for linking a next buffer sub-segment. The array may reside in dynamic random access memory (DRAM) associated with the buffer, for instance, or in another suitable type of memory as is generally known, i.e., firmware data structures are typically not resident in the application specific integrated circuit (ASIC) hardware implemented as a buffer manager, but rather are maintained in external, or "off-chip," memory. While the FIG. 2 embodiment illustrates a firmware data structure supporting 1024 buffer sub-segments, it is noted that the number of sub-segments utilized by firmware may be arbitrarily selected, and may depend upon a particular caching scheme, for example, or other factors such as whether variable size sub-segments are to be supported. In some embodiments, it may be desirable to support 2048, 4096, 8192, or greater sub-segments.

One cache scheme may employ uniform buffer sub-segmentation, i.e., each buffer sub-segment may be of a fixed and constant size. In some implementations, the entire cache buffer space may be divided evenly by a constant that is a power of 2; this facilitates rapid calculations and reduces computation time. In one example, the size of each sub-segment may be 8 kilobytes (KB) in a cache having a total size of 8 megabytes (MB), though the size of fixed buffer sub-segments may be adjusted or tuned in accordance with desired operational characteristics of a product or application. For example, it may be desirable in some instances to fix sub-segment size at 4 KB for a particular product, while it may be desirable to fix sub-segment size at 64 KB or 128 KB for another product. Sub-segment size may also be influenced by the overall size of the cache, for example, or other considerations such as achieving or maintaining certain pre-controlled buffer fragmentation levels. In general, many firmware implementations employ a large number of sub-segments that are small relative to the overall size of the cache; the more sub-segments that are involved in a host or disk data transfer, the longer it takes to set up hardware buffer sub-segments as set forth below.

Figure 3:
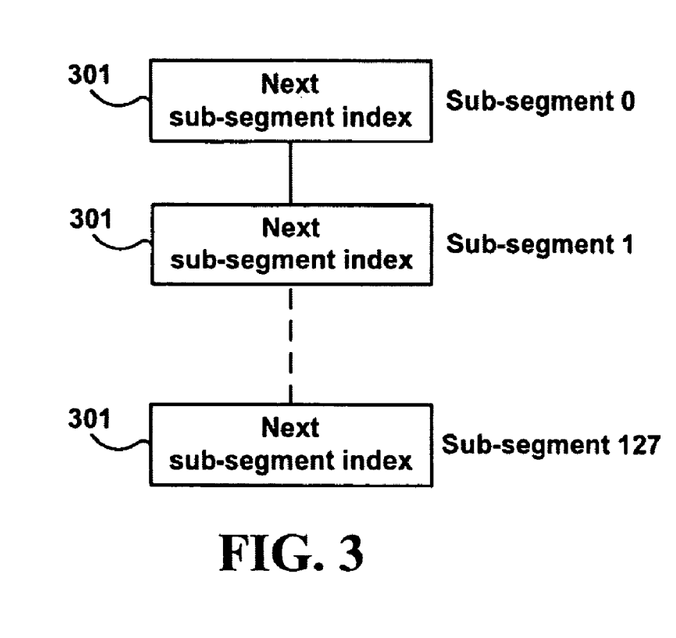
FIG. 3 is a simplified diagram illustrating one embodiment of a portion of a hardware data structure including a linked list of buffer sub-segment descriptors.
Figure 4:
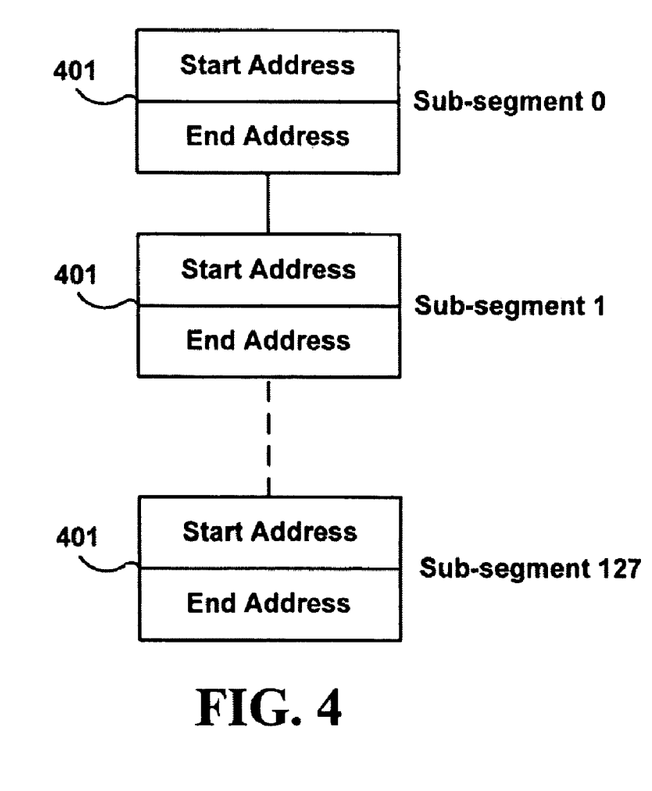
FIG. 4 is a simplified diagram illustrating one embodiment of a portion of a hardware data structure including an array of buffer sub-segment descriptors.

With respect to hardware, as illustrated in FIG. 3, each sub-segment may be linked to a next or subsequent sub-segment with an index 301, for example, to a table or other data structure stored in memory that is internal to the hardware. As indicated in FIG. 4, for each sub-segment, a hardware buffer descriptor 401 may include a start address and an end address identifying the location of the buffer sub-segment in memory. The data structures illustrated in FIGS. 3 and 4 may be maintained (e.g., in a hardware sub-segment descriptor table) on-chip, i.e., in the ASIC implemented as a buffer manager, and accordingly may be of limited size. Even if appropriate lookup tables or other data structures are maintained off-chip in a memory of arbitrary size, the number of buffer sub-segments recognizable by the hardware of a buffer manager is limited by the number of available hardware registers or other physical limitations of the logic employed (such as in an ASIC).

Contrasting FIGS. 3 and 4 with FIG. 2, it will be appreciated that the number of recognized hardware sub-segments may be significantly limited as compared with the number of sub-segments employed by firmware. While the embodiment illustrated in FIGS. 3 and 4 is capable of recognizing 128 buffer sub-segments, a hardware data structure may be able to support more or fewer sub-segments depending upon a variety of factors such as overall size of on-chip memory, the number of hardware registers available, and so forth. In any event, because hardware is generally limited by physical constraints and firmware is generally not, many practical applications of buffer management involve firmware that utilizes more sub-segments than is physically possible for the particular hardware implementation.

As a consequence, in traditional buffer management architectures, firmware must be employed to flush the hardware sub-segment descriptor table and to update the table with data that are needed to program, or set up, the hardware registers when a buffer sub-segment required by firmware is beyond the range currently stored in the data structure maintained in memory internal to the hardware. As illustrated in FIGS. 2-3, the information maintained by the firmware is not the same as the information maintained in the hardware sub-segment descriptor table (i.e., the data structures are not common), and so limited information from the firmware must be used to generate the data for the hardware table. For example, a start address and an end address may be computed for a particular sub-segment, but only if the start address of the first sub-segment in the buffer is known and subject to the constraint that all sub-segments are of uniform length.

As another example, where 128 hardware registers are set (in accordance with an internal hardware sub-segment descriptor table) to recognize sub-segments 0-127, but a command requires transfer of data from a firmware sub-segment outside of this range (e.g., sub-segment 1023), the hardware registers must be flushed, and reprogrammed with data associated with the range of sub-segments that includes the required sub-segment (in this example, sub-segment 1023). For this to occur, firmware must replace entries in the hardware sub-segment descriptor table, since it is this table that allows the registers to be programmed. As noted above, the data required by the hardware is different than the data maintained in firmware, and so it must be generated, which consumes cycle time. This process is inefficient, increases command overhead, and is exacerbated by large commands that require access across multiple buffer segments. In some implementations, the hardware sub-segments may be split, for instance, such that half of the available registers are devoted to host transfers while the other half of the available registers are devoted to disk or other peripheral transfers; this division of hardware resources makes the problem worse.

In accordance with some embodiments, a system and method of buffer management as set forth herein may eliminate the requirement for hardware to maintain a descriptor table defining hardware buffer sub-segments, i.e., the hardware may be efficiently programmed once to recognize and to navigate a buffer sub-segment data structure that is common to hardware and firmware. Accordingly, the number of registers required in hardware may be substantially reduced; further hardware simplification may be achieved because on-chip memory need not be devoted to a hardware sub-segment descriptor table.

In that regard, where a format to describe buffer sub-segments may be recognizable and employed by both hardware and firmware (i.e., a "common data structure" that is employable by both firmware and hardware), the firmware need not devote cycle time to programming hardware by repetitively copying data to an internal table as segments of the buffer are traversed. As with conventional firmware buffer descriptors, the buffer descriptors of a common data structure (with a hardware- and firmware-recognizable format) may reside in DRAM or another suitable off-chip memory such that the number of buffer descriptors employed by the buffer manager may be limited only by the size of the memory. As set forth in more detail below, such a format may also be flexible enough to support fixed or variable sub-segment size.

Employing a common data structure generally requires the hardware in the buffer manager to fetch the next sub-segment information from DRAM rather than from internal register banks. With regard to disk data transfer, for example, if the hardware does not fetch the information from external memory in a timely fashion, it may cause a performance penalty by slipping a disk revolution. Accordingly, it may be desirable to design the hardware specifically taking into consideration the capabilities and operational characteristics of the firmware.

Figure 5:
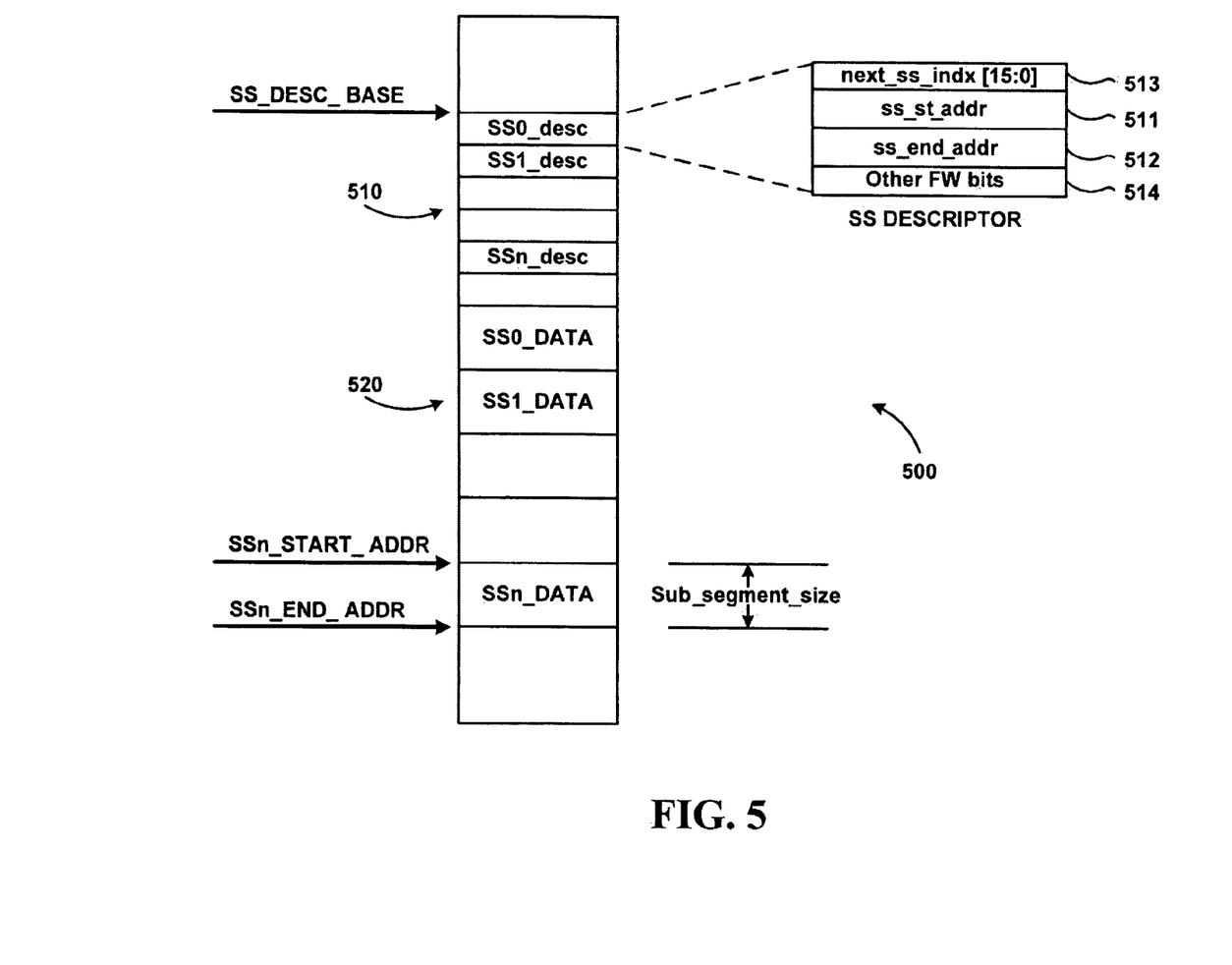
FIG. 5 is a simplified diagram illustrating one embodiment of a common data structure employed by both firmware and hardware.

FIG. 5 is a simplified diagram illustrating one embodiment of a common data structure employed by both firmware and hardware. As illustrated in FIG. 5, common data structure 500 may generally comprise sub-segment descriptors 510 (SS0_desc, SS1_desc, . . . SSn_desc) and data blocks 520 (SS0_DATA, SS0_DATA, . . . SSn_DATA). It will be appreciated that descriptors 510 may be arranged sequentially in memory addresses, i.e., such that the descriptor for sub-segment n−1 directly precedes the descriptor for sub-segment n, the descriptor for sub-segment n−2 directly precedes the descriptor for sub-segment n−1, and so forth.

In one embodiment, each descriptor 510 (such as the illustrated SS0_desc) includes a start address 511 field, an end address field 512, and an index or pointer field 513 that identifies the next sub-segment in a linked list structure. Optionally, a descriptor 510 may also include other bits 514 that may be employed by firmware; these bits 514 may be application or device specific, for example, and may be selectively utilized as desired by design engineers to improve device performance, to increase efficiency, to set cache fragmentation thresholds, or to facilitate trouble-shooting or debugging during design.

It is noted that, because the start and end address for the data block 520 of each sub-segment is defined in a descriptor 510, common data structure 500 illustrated in FIG. 5 supports sub-segments having variable size. The size of SSn_DATA is illustrated by way of example, but the size of other data blocks need not be equal or uniform. Additionally, since every descriptor 510 includes a start address and end address for its respective sub-segment data block 520, the sub-segments need not be arranged sequentially in memory addresses, i.e., a data block 520 for sub-segment 10 may precede (in terms of memory address) the data block 510 for sub-segment 7.

Figure 6A:
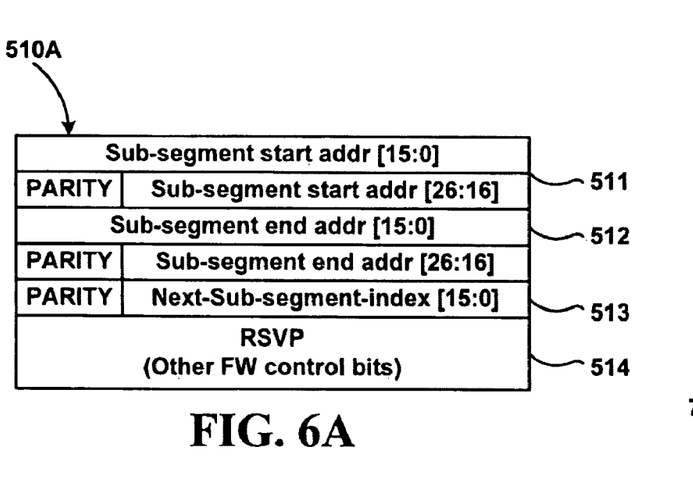
FIGS. 6A and 6B are simplified diagrams illustrating different embodiments of a buffer sub-segment.
Figure 6B:
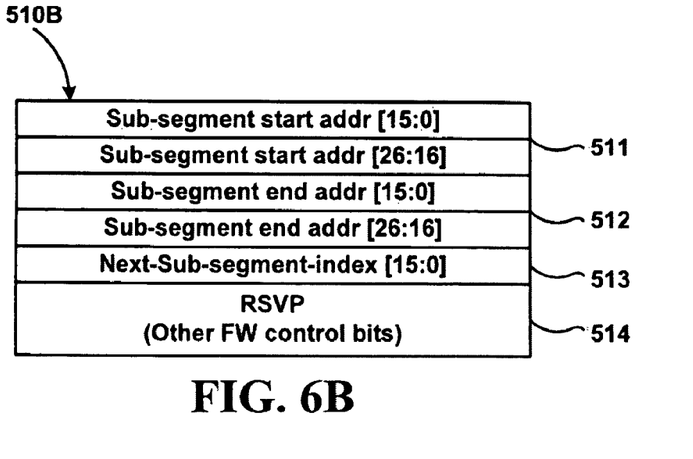

FIGS. 6A and 6B are simplified diagrams illustrating different embodiments of a buffer sub-segment. The embodiment of FIG. 6A may provide parity protection; this parity support may limit the number of sub-segments. In some implementations, for instance, providing parity protection in sub-segment 510A may limit the number of sub-segments to 32K, depending, for example, upon the overall size of the buffer, the memory devoted to defining descriptors 510A, or both. In the embodiment of FIG. 6B without parity protection, up to 64K sub-segments may be supported in some instances, again, depending upon the size of the buffer and the descriptors 510B. As noted above, the number of logical buffer sub-segments supported may be increased without changing an ASIC or other hardware associated with the buffer manager.

In operation, when a sub-segment is required by a command, data from the fields illustrated in FIGS. 6A and 6B may be used to set hardware registers in the buffer manager hardware directly, without firmware intervention and without updating a descriptor table that is stored internal to the hardware.

Figure 7:
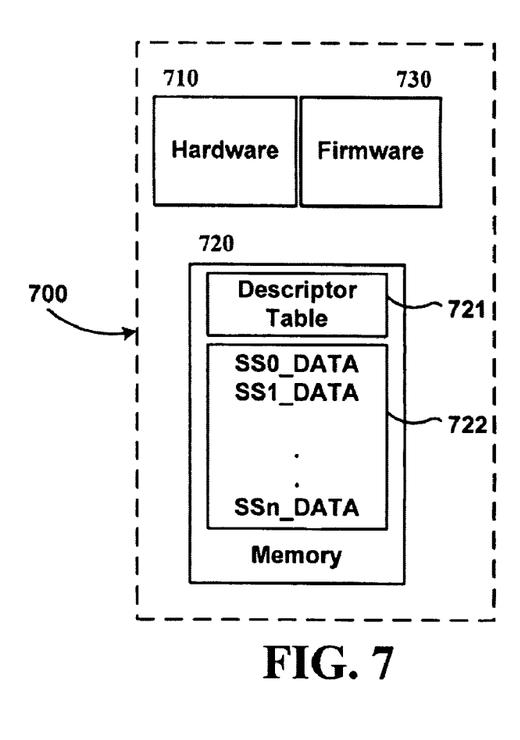
FIG. 7 is a simplified functional block diagram illustrating one embodiment of a buffer manager configured to operate in conjunction with a common data structure recognized by both hardware and firmware.

FIG. 7 is a simplified functional block diagram illustrating one embodiment of a buffer manager configured to operate in conjunction with a common data structure recognized by both hardware and firmware. As indicated in FIG. 7, a buffer manager 700 may generally employ a hardware component 710 (such as an ASIC) and firmware 730 cooperating to manage a buffer maintained in a memory 720.

As set forth above, memory 720 may be implemented as DRAM in some instances. Alternatively, memory 720 may be implemented as synchronous DRAM (SDRAM), or double data rate (DDR) SDRAM, though other types may be appropriate for some applications. In some embodiments, memory 720 may be implemented in conjunction with error correction code (ECC) techniques. Memory 720 may be designed and constructed to support or otherwise to satisfy the data transfer requirements of a system or peripheral device in conjunction with which buffer manager 700 is intended to be used. As illustrated, memory 720 may be implemented off-chip, i.e., independent of the ASIC or logic of hardware 710.

Memory 720 may be used for buffering data to be transferred. In the FIG. 7 embodiment, memory 720 may be configured to maintain a common data structure such as illustrated in FIG. 5. In one embodiment, memory 720 may generally comprise a sub-segment descriptor table 721 to facilitate organization of a plurality of sub-segment descriptors 510 (such as SS0_desc, SS1_desc, . . . SSn_desc) at contiguous memory addresses substantially as set forth above. Additionally, memory 720 may comprise a data portion 722 configured to maintain sub-segment data blocks 520 (such as SS0_DATA, SS1_DATA, . . . SSn_DATA) at arbitrary addresses in memory 720.

Hardware component 710 may be implemented as an ASIC, for example, or as a programmable logic controller (PLC), a microprocessor or microcomputer, or other controller suitable to manage data transfer in accordance with requirements of a system or device with which buffer manager 700 is intended to be employed. Various types of hardware logic are generally known and operative to support data transfer in accordance with various protocols. The present disclosure is not intended to be limited to any particular structure or configuration of hardware 710, provided that it is amenable to accessing and utilizing a common data structure to set registers substantially as set forth herein.

In operation, hardware 710 may manage access to memory 720 by an external device (e.g., a host, drive, or other peripheral). In that regard, hardware 710 generally includes, among other logic and control functionality, programmable registers that may be loaded with data associated with sub-segment descriptors 510 (retrieved from descriptor table 721 in external memory 720) to facilitate data transfer. These registers, loaded with address and link information related to a sub-segment, control which areas of data portion 722 may be read or written responsive to a command. Since hardware 710 may employ the data structure managed by firmware 730 off-chip, internal sub-segment descriptor tables may be eliminated, and the number of registers devoted to sub-segment handling may be greatly reduced, without sacrificing performance.

Firmware 730 may be used for logically organizing memory 720 into sub-segments. In that regard, firmware 730 may be configured to define and to manage the data structure maintained in memory 720 and to enable hardware 710 to access descriptor table 721 such that appropriate data from data portion 722 may be transferred in accordance with commands (e.g., host or device commands) received by hardware 710. With reference to FIGS. 5 and 7, firmware 730 may be operable to manage the descriptor table 721 so as to maintain the integrity of the linked list structure of the sub-segment descriptors 510. In that regard, firmware 730 may dynamically modify address fields 511 and 512 and next sub-segment indices 513 as data in the data portion 722 of the buffer change or are moved to a new address. It may be desirable in some instances to store firmware 730 off-chip, i.e., independent of hardware 710, such as in independent DRAM, SDRAM, DDR SDRAM, or some other type of computer readable data storage medium. As an alternative, some or all of the data and instruction sets associated with firmware 730 may be stored in memory internal to hardware 710.

The following description addresses sub-segment fetch request handling in a buffer manager.

Using the registers illustrated in FIGS. 6A and 6B, for example, a sub-segment end address 512 may be fetched from the current sub-segment descriptor 510. When the current request operation reaches the end address for the current sub-segment (i.e., signifying the end of the data transfer associated with a particular sub-segment), a sub-segment descriptor may be loaded from the next sub-segment descriptor register (provided that the next sub-segment descriptor is valid) and a sub-segment descriptor read request may be issued to bring in the next-to-next sub-segment descriptor entry. In one embodiment, firmware 730 may instruct hardware 710 to retrieve a particular sub-segment descriptor 510 from descriptor table 721 and load the particular sub-segment descriptor 510 into a register. As settings at the register for the current sub-segment enable hardware 710 to initiate a transfer of data to or from the appropriate address in data portion 722, the next sub-segment pointer 513 may allow hardware 710 to retrieve the sub-segment descriptor 510 for the next sub-segment and to set a hardware register for the next sub-segment, i.e., data for the next sub-segment is being cached in hardware registers while operations related to the current sub-segment are on-going. When the data transfer associated with the current sub-segment is finished, the data transfer associated with the next sub-segment may begin while the current register may be flushed such that it may be re-used for the next-to-next, or a subsequent, sub-segment.

In the foregoing manner, hardware registers may be dynamically set in accordance with the data structure of the sub-segment descriptors 510, i.e., based upon the next sub-segment descriptor field or index 513, without intervention on the part of firmware 730 and without requiring that the hardware maintain a detailed sub-segment descriptor table. This strategy may simplify hardware 710 considerably, since support for 128 or more sub-segments need not be built in to the physical structure or logic of hardware 710. Since only one sub-segment is operated upon at any given time, and since registers may be dynamically flushed and re-used based upon the data structure, hardware 710 may be implemented to provide physical support for as few as two sub-segments: one set of registers for the current sub-segment; and one set of registers for caching the next sub-segment. In one embodiment, three sets of registers may be employed: one set of registers for the current sub-segment; one set of registers for the next sub-segment; and one set of registers for the previous sub-segment (while the current sub-segment is being processed these registers are being flushed in preparation for caching the next-to-next sub-segment). This implementation enables sub-segment caching that saves chip real estate and implementation costs without sacrificing data transfer performance. In general, more registers supporting more sub-segments may be added in accordance with design preferences and desired overall data transfer rates.

In the foregoing sequence, if the next sub-segment descriptor 510 entry sought by hardware 710 is not valid, a "block_access" interrupt may be generated to prevent further buffer access, and a sub-segment descriptor read request may be issued to retrieve a valid descriptor entry (i.e., from descriptor table 721) which would become the current descriptor entry identifying the current sub-segment.

It will be appreciated that, once a host or disk sub-segment fetch request is received, buffer manager 700 may execute any of various arbitration schemes to prioritize or otherwise to handle the request; this is true because the common data structure defining sub-segment descriptors 510 and sub-segments 520 is maintained off-chip, and is a shared resource. This arbitration may introduce a short latency period, but may not appreciably degrade performance. In some implementations, a round robin arbitration may be executed to control access to the buffer, specifically, the data portion 722 of memory 720. In some instances, it may be desirable to provide fairness in arbitration between host sub-segment and disk sub-segment fetch requests; as an alternative, it may be desirable to provide either the host or the disk with an advantage in arbitration in some circumstances. Various arbitration schemes are generally known, and the present disclosure is not intended to be limited to the strategies employed by, or the operational characteristics of, any particular type of arbitration technique. Additionally, in some implementations, an interlock mechanism may be established between hardware and firmware for read-modify-write operations as is generally known. Such an interlock mechanism may apprise firmware 730 of the status of operations being performed by hardware 710 such that processing may not be interrupted inappropriately.

Figure 8:
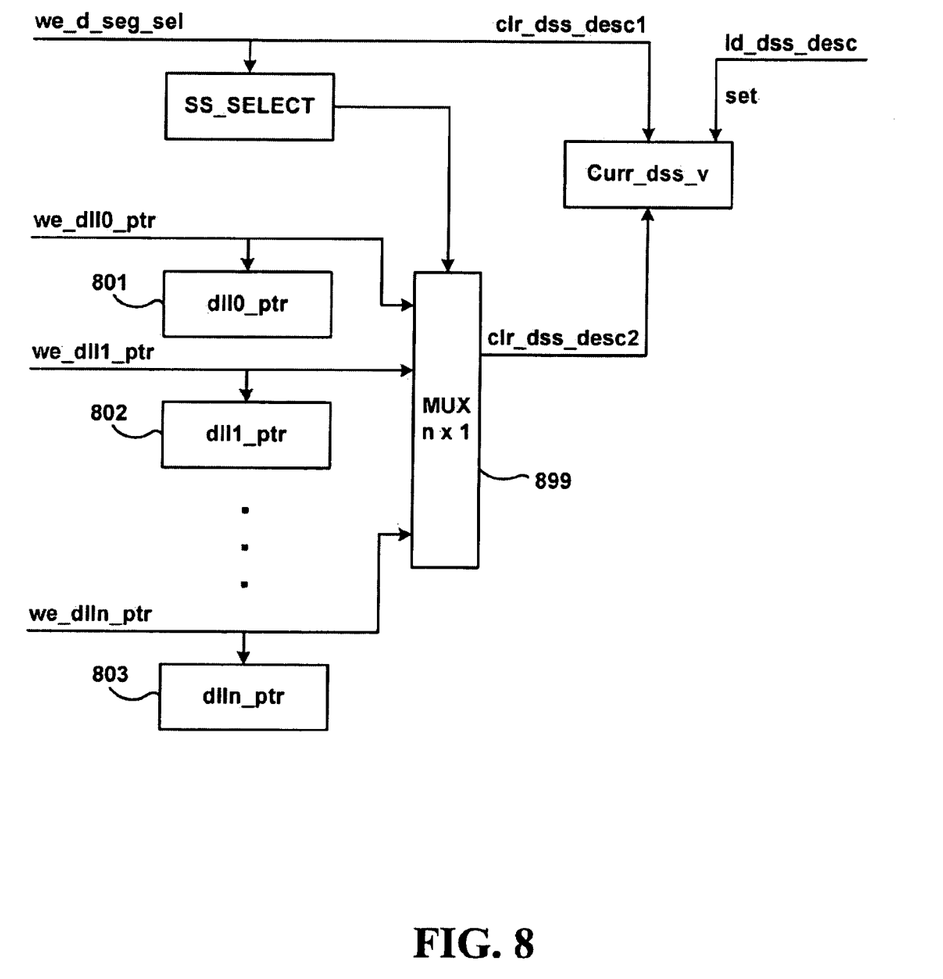
FIG. 8 is a simplified diagram illustrating components of one embodiment of a buffer manager hardware architecture.

As noted above with reference to FIGS. 5 and 7, sub-segments may be maintained in a linked list structure, in accordance with which each sub-segment descriptor 510 includes a pointer or index 513 to a next sub-segment. Firmware 730 may generally manage each index 513 to ensure that descriptors 510 loaded into hardware 710 are accurate. Additionally, firmware 730 may further logically organize sub-segments into multiple linked lists (e.g., ring buffers) each of which logically links data from data portion 722 of memory 720 in sequence. Registers in hardware 710 may maintain pointers to various of such ring buffers. At the beginning of a data transfer, the current and next sub-segment descriptors 510 may be fetched from descriptor table 721 for the current linked list pointer. This is illustrated in FIG. 8, which is a simplified diagram illustrating components of one embodiment of a buffer manager hardware architecture. A sub-segment select signal (SS_SELECT) may be asserted by firmware on the line labeled we_d_seg_sel, indicating to a multiplexer 899 which of the pointers (dll0_ptr, dll1_ptr, dll2_ptr, or dlln_ptr) to use from registers 801-803. These pointers indicate respective starting points for different ring buffers of different linked lists. In one embodiment, four different linked lists may be employed, but as indicated in FIG. 8, an arbitrary number, n, of linked lists may be supported by the architecture.

During a data transfer (in one embodiment), if a buffer segment selection changes, the cached sub-segment entries may be invalidated and new entry fetched; similarly, if sub-segment selection changes, the cached sub-segment entries may be invalidated and new entry fetched. As noted above, when the end address 512 for a sub-segment 520 is reached in data portion 722, a new sub-segment descriptor 510 may be loaded (i.e., using the next sub-segment 513 field) as the new current sub-segment; a current transfer pointer may be loaded with the start address 511 of the current sub-segment 520, while the next sub-segment descriptor 510 is fetched from descriptor table 721.

Figure 9:
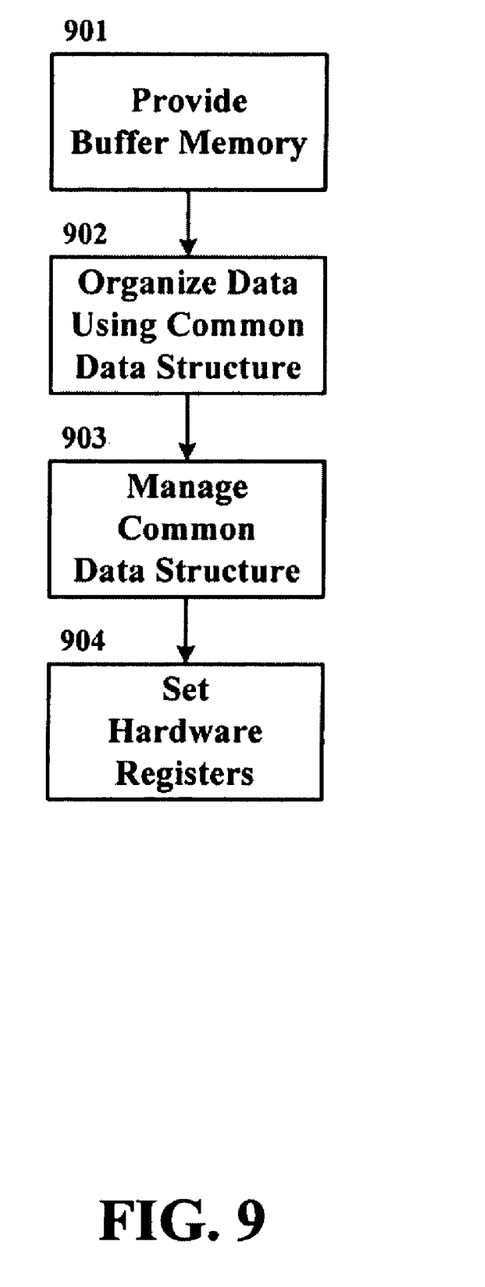
FIG. 9 is a simplified flow diagram illustrating the operation of one embodiment of a method of managing a buffer.

FIG. 9 is a simplified flow diagram illustrating the operation of one embodiment of a method of managing a buffer. As indicated in FIG. 9, a method of managing a buffer may generally begin with providing a memory to buffer data to be transferred responsive to a command (block 901); this memory may be of arbitrary size and include a data portion (such as indicated by reference numeral 722 in FIG. 7) configured to store data that are accessed frequently or recently, for example, as is generally known.

As set forth above, the data may be logically organized in accordance with a common data structure that is recognizable by firmware and a hardware component (block 902). In the illustrated embodiments, such a common data structure may comprise a sub-segment descriptor table (e.g., as indicated by reference numeral 721 in FIG. 7) that identifies a start address and an end address for each buffer sub-segment; where the structure is organized as a linked list, the common data structure may also include a pointer to a next sub-segment, a previous sub-segment, or both. Where firmware and hardware do not employ compatible data structures (as described above with reference to FIGS. 2-4), one or more tables maintained in a memory internal to hardware need to be updated repeatedly during data transfer; these updates require firmware intervention and data format translation. Providing a common data structure, on the other hand, enables hardware registers to be set directly, i.e., without an internal descriptor table and firmware updates.

The common data structure may be managed by firmware as indicated at block 903. As set forth above, firmware may be employed to modify the sub-segment descriptor table with updated pointers and addresses as the contents of the buffer are changing responsive to buffer reads and writes. Dynamic management of the descriptor table may ensure that the linked list structure is accurate and that the hardware does not enable access to a portion of the buffer in error. The firmware may also enable the hardware to access the common data structure, for example, by providing a pointer to a current linked list responsive to a command or request for buffer access substantially as set forth above.

Finally, registers in the hardware may be set in accordance with the common data structure to facilitate transfer of the data as indicated at block 904. In some embodiments, the hardware may be caching the descriptor table entry for the next sub-segment during the transfer of data associated with the current sub-segment as set forth above.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A buffer manager comprising:
   a memory to buffer data to be transferred responsive to a command;
   a hardware component to manage access to the memory; and
   firmware to organize the data logically in accordance with a common data structure that is recognizable by the firmware and the hardware component, wherein the common data structure comprises a descriptor table to define a plurality of sub-segments, wherein the descriptor table identifies, for each respective one of the plurality of sub-segments: a start address; an end address; and a next sub-segment in a linked list;
   wherein the hardware component is programmable by the firmware and operative to set registers in accordance with the common data structure to facilitate transfer of the data.

2. The buffer manager of claim 1 wherein the common data structure is implemented in a memory external to the hardware component.

3. The buffer manager of claim 1 wherein the common data structure defines a plurality of sub-segments and wherein the hardware component is programmed to navigate the plurality of sub-segments to fetch next sub-segment information.

4. The buffer manager of claim 3 wherein the memory maintains a table to identify, for each respective one of the plurality of sub-segments, a start address.

5. The buffer manager of claim 3 wherein the firmware organizes the data into a plurality of sub-segments of variable sizes.

6. The buffer manager of claim 1 wherein the hardware component sets registers using information retrieved from the descriptor table.

7. The buffer manager of claim 1 wherein the firmware further logically organizes the data into multiple linked lists comprising ones of the plurality of sub-segments.

8. A method of managing a buffer; the method comprising:
   providing a memory to buffer data to be transferred responsive to a command;
   logically organizing the data in accordance with a common data structure that is recognizable by firmware and a hardware component, wherein the logically organizing comprises maintaining a descriptor table that divides the data into a plurality of sub-segments;
   employing the firmware to manage the common data structure and to enable the hardware component to access the common data structure; and
   setting registers in the hardware component in accordance with the common data structure to facilitate transfer of the data, wherein the setting comprises using information retrieved from the descriptor table.

9. The method of claim 8 wherein the memory maintains a table to identify, for each respective one of the plurality of sub-segments, a start address.

10. The method of claim 8 wherein the sub-segments are of variable sizes.

11. The method of claim 8 wherein the employing comprises maintaining a linked list of ones of the plurality of sub-segments.

12. The method of claim 11 wherein the employing further comprises updating the descriptor table.

13. The method of claim 8 wherein the information comprises, for each respective one of the plurality of sub-segments: a start address; an end address; and a pointer to a next sub-segment in a linked list.

14. The method of claim 13 further comprising caching a descriptor table entry for the next sub-segment in the linked list during transfer of the data associated with a current sub-segment.

15. The method of claim 14 wherein the caching comprises setting registers in the hardware component using, for the next sub-segment: the start address; the end address; and the pointer.

16. A buffer manager comprising:
- a memory to buffer data to be transferred responsive to a command;
- a hardware component to manage access to the memory; and
- firmware to organize the data logically in accordance with a common data structure that is recognizable by the firmware and the hardware component;
- wherein the common data structure comprises a descriptor table to define a plurality of sub-segments of the data;
- wherein the hardware component is programmable by the firmware and operative to set registers in accordance with the common data structure to facilitate transfer of the data; and
- wherein the hardware component is configured to set the registers using information retrieved from the descriptor table.

17. The buffer manager of claim 16 wherein the common data structure is implemented in a memory external to the hardware component.

18. The buffer manager of claim 16 wherein the common data structure defines the plurality of sub-segments and wherein the hardware component is programmed to navigate the plurality of sub-segments to fetch next sub-segment information.

19. The buffer manager of claim 16 wherein the memory maintains a table to identify, for each respective one of the plurality of sub-segments, a start address.

20. The buffer manager of claim 16 wherein the firmware organizes the data into the plurality of sub-segments of variable sizes.

* * * * *